Inventors
John W. Hobbs.
John A. Miner.
by Charles W. Wills Attys

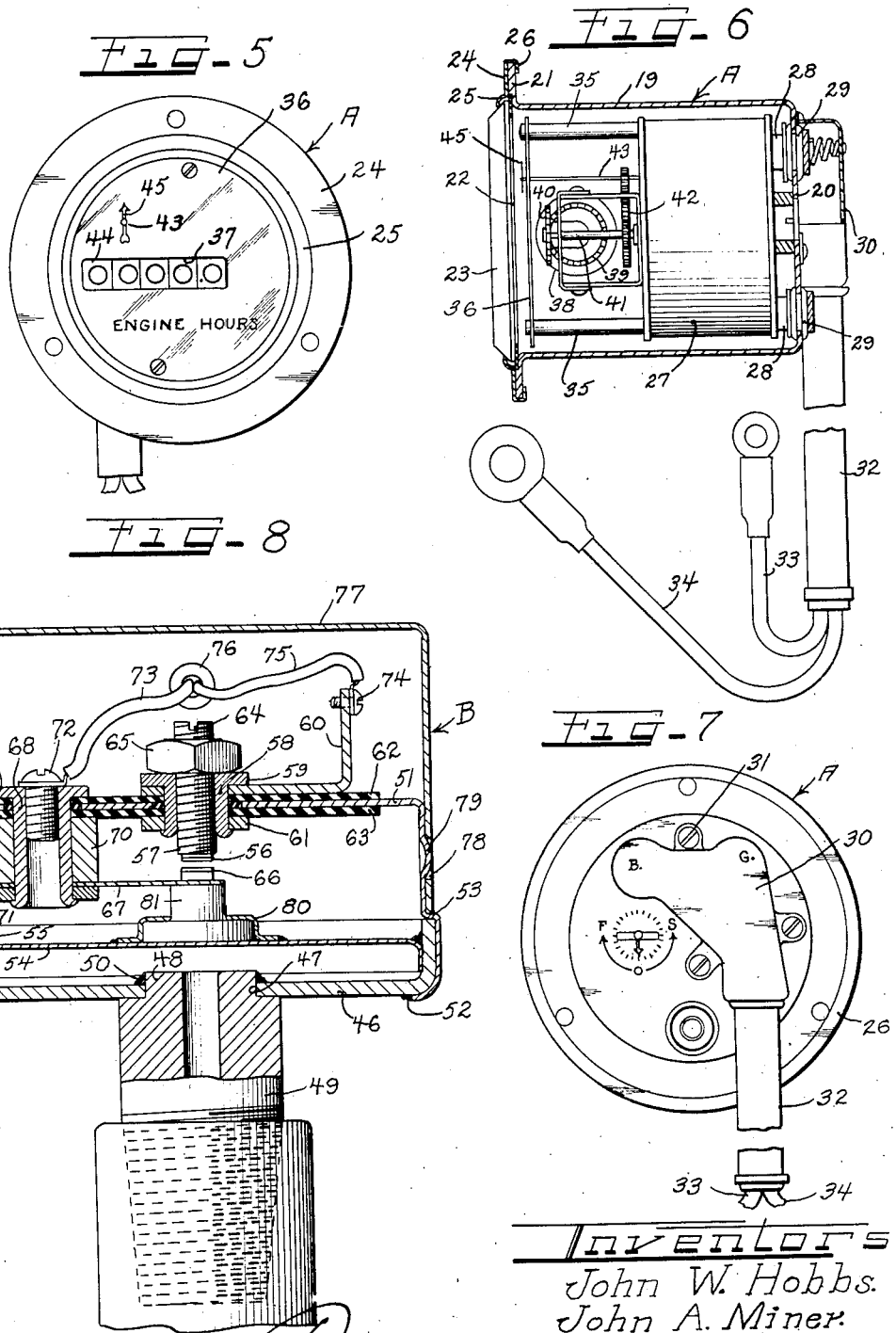

Patented Aug. 25, 1942

2,294,031

UNITED STATES PATENT OFFICE 2,294,031

ENGINE OPERATION RECORDER

John W. Hobbs and John A. Miner, Springfield, Ill., assignors to John W. Hobbs Corporation, Springfield, Ill., a corporation of Delaware Application August 29, 1940, Serial No. 354,718

2 Claims. (Cl. 161—15)

The present invention relates in general to an engine operation recorder and is more specifically concerned with improved means for timing and recording the total actual operating time of the engine, said means being controlled in its operation by the starting and stopping of the engine.

Recorders embodying the principles of the hereindescribed invention may be advantageously utilized with engine installations where it would be desirable to know at all times the total number of hours which the engine has been run. Such indications are of value in marine installations, and particularly upon engine driven vehicles. For example, it may be advantageously utilized as a telltale on the number of hours that a tractor motor has been run. Without such an arrangement, it is possible for the user of a tractor to subject the tractor to exceptionally hard usage and later claim that it had been run only a very small amount of time. From the manufacturer's standpoint, such a meter would serve as a check on the operating reports of the engine user, and inasmuch as the totalizing meter and pressure switch are constructed so as to be tamper-proof, the recorder would clearly indicate the extent of use of the tractor motor. The engine operation recorder may be utilized with gasoline engines having an ignition system, and is equally adapted for use with engines such as Diesel engines which do not have an ignition system operating from a distributor, generator or battery as in the usual gasoline engine arrangement.

The invention has for a primary object the provision of an improved totalizing hour meter making use of a self-starting electric clock mechanism, which may be controlled in its operation either by variations in the oiling system of the engine, the operation of the battery charging system of the engine, or a combination of both.

Another object of the hereindescribed invention is to provide an improved totalizing hour meter for indicating the total hours of operation of an engine, which is simple of construction, tamper-proof, and which is efficient and accurate in operation.

Still another object is to provide an improved pressure actuated switch controlled unit for the meter which may be actuated by oil pressure from the engine lubricating system, said unit having a diaphragm and contacts contained within a casing sealed at the factory to prevent leakage and to prevent tampering therewith, and which utilizes a novel contact arrangement which prevents abnormal flexing of the diaphragm under excessive pressures to such an extent as to permanently distort the diaphragm or otherwise damage the unit.

Other objects and features of the invention will more fully appear from the detailed description, taken in connection with the accompanying drawings, which illustrate the invention and several arrangements for connecting it with the engine, and in which:

Figure 5 is a view of the totalizing hour meter as seen when looking toward its face;

Figure 6 is a sectional view taken longitudinally through the casing of the meter and showing the arrangement of its internal parts and electrical connections thereto;

Figure 7 is a rear view of the meter; and

Figure 8 is a sectional view through the pressure control switch unit utilized in the present invention.

As shown on the drawings:

In its broad concept the present invention includes an electrically actuated timing device as generally indicated at A. This device is arranged to indicate or totalize the amount of time it is in operation. It will therefore be apparent that if this device or a totalizing meter is connected to a source of electric energy in such a manner that this source may be controlled in response to the operation and non-operation of an engine, the meter may be utilized to register and indicate the total time of operation of the engine in suitable units such as hours or fractions thereof.

The meter A may be variously connected with the engine, the operation of which it is to record, depending upon the particular type of engine, that is, whether it utilizes an ignition system or whether it is of the Diesel type which is not dependent upon an electric ignition system for its operation.

Figure 1:
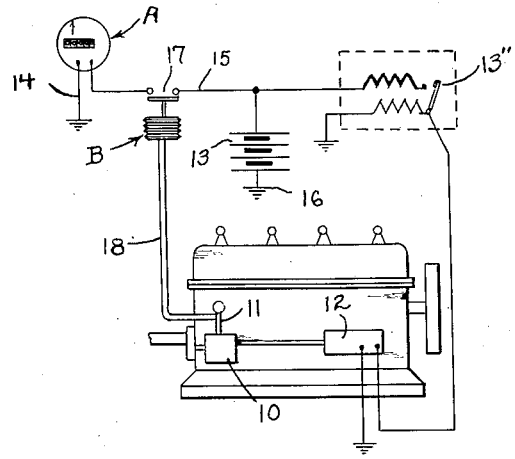
Figure 1 is a view schematically showing the recorder connected with an engine for utilizing a battery charging generator and oil pressure lubricating pump for controlling the recorder.

Referring to Figure 1, the engine operation recorder is shown as being utilized with an engine of the gasoline-engine type having an oil pump 10 driven from the engine, which supplies lubricating oil under pressure through a suitable outlet pipe connection, as indicated at 11. The engine in this case also includes a generator 12 which is driven by the engine through any suitable connection for such purpose, in the present instance, the generator being shown as being driven by a shaft common to the generator and oil pump.

This generator is utilized in connection with the ignition system of the engine, and as is the custom, is utilized for charging the usual storage battery as indicated at 13, this battery being connected in circuit with the generator through a reverse current relay or cut-out 13″ as is the usual practice. Only such parts of the ignition system as are directly concerned with the present invention have been shown.

One side of the totalizing hour meter A is grounded through a connection 14, and the other circuit terminal of the meter is connected through a conductor 15 to one side of the battery 13, the other side of the battery being grounded as shown at 16.

For controlling the energization of the meter A, in this particular arrangement, the conductor 15 has disposed therein the contacts 17 of a pressure actuated switching device as generally indicated at B, and connected through a suitable conduit 18 with the pressure lubricating system of the engine at any suitable part thereof. In this instance, the conduit is shown as being connected at the outlet of the oil pump.

In the arrangement just described, it will be apparent that the meter A will be directly in circuit with the ignition battery of the engine ignition system, whenever the engine is started up and the oil pressure in the lubricating system reaches sufficient value of pressure to close the contacts of the pressure switch B and thus connect the mechanism of the meter and start its operation. Likewise, when the engine is shut down, the pressure switch contacts will open and the operation of the meter discontinued.

Figure 2:
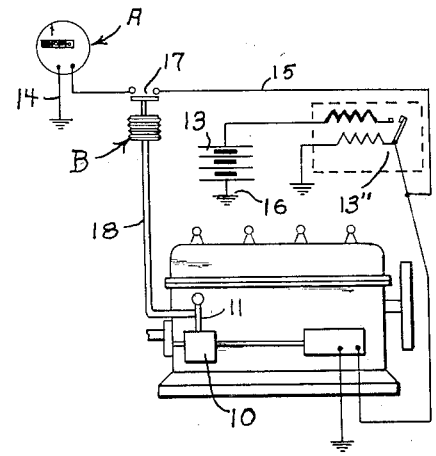
Figure 2 is a similar view showing a modified arrangement of the connections of Figure 1.

The arrangement shown in Figure 2 is similar to that shown in Figure 1, except that instead of connecting the conductor 15 to one side of the battery 13, the conductor 15 is connected between the cut-out and the generator in the circuit for charging the battery. With this arrangement, the energization of the recording meter will take place independently of the operation of the cut-out and the condition of the battery of the ignition system of the engine.

Figure 3:
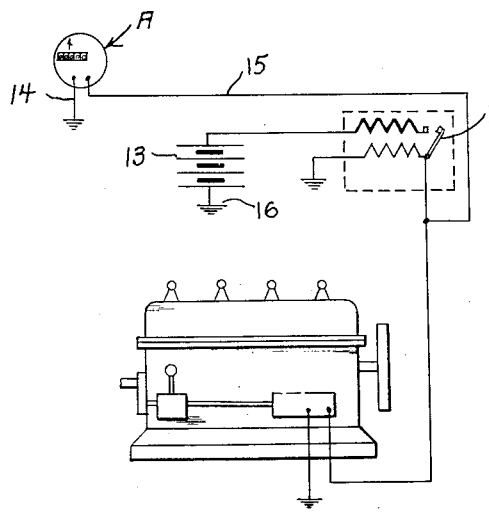
Figure 3 is a schematic diagram showing the connections of the recorder so as to control its operation from the battery charging system of the engine.

In Figure 3 there is shown an arrangement in which the pressure switch B has been dispensed with, the conductor 15 in this case being continuous and connected in the manner shown in Figure 2. In this arrangement, it is not necessary to build up pressure in the lubricating system of the engine in order to energize the meter A, since the meter will be energized just as soon as voltage is established on the generator.

Figure 4:
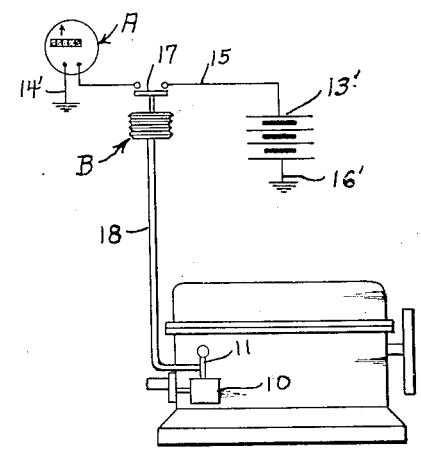
Figure 4 is a schematic diagram showing the meter controlled from the oil pressure lubricating system of the engine.

Figure 4 illustrates an arrangement which may be utilized in connection with Diesel engines which do not depend upon electric ignition for operation, or where it is desired to utilize a separate battery 13′ as the source of current supply for the meter A. In this arrangement, however, the control of the energization of the meter is accomplished solely through the use of the pressure switch B in the manner previously described.

The totalizing hour meter, more specifically, comprises as shown in Figures 5, 6 and 7, a main casing 19 which is of generally cup-shaped construction having a closed end 20 and its opposite end open, this latter end being provided with a rim flange 21.

Supported on a gasket 22 is a transparent plate 23 which forms a viewing window. This plate is retained in position by an annular clip 24 having a flange portion for engaging a beveled edge on the plate 23 and another flange for engaging the periphery of the rim 21, these flanges being respectively shown at 25 and 26.

Within the casing 19 is a second casing 27 which houses a clock timing mechanism, in this instance, the mechanism being electrically actuated. The clock mechanism is supported on studs 28 which extend through the bottom of the casing 19 and are resiliently supported therein by resilient grommets 29, certain of these studs being cooperatively associated with a cover member 30 which is secured as by screws 31 to the closed end of the casing 19. This cover member houses the connections to the clock and is connected to a suitable conduit 32 through which a pair of conductors 33 and 34 are brought into the cover 30. The conductor 33 is arranged to be connected to a live conductor, whereas the conductor 34 would be grounded.

Supported upon a plurality of spacing arms 35 which extend from the clock mechanism forwardly toward the open end of the casing 19, there is provided a dial plate 36 having a rectangular opening 37 therein.

Disposed behind the opening 37, there is provided a registering counter 38 in the form of an odometer, the construction of which is well known. The odometer embodies a driving gear 39 which meshes with a gear 40 on a shaft 41 which is connected for continuous operation through a chain of gears 42 to the minute shaft 43 of the clock movement. In the odometer construction, there are a plurality of axially aligned discs 44 which are disposed behind the opening 37 of the dial plate. In the present instance, five discs are provided, and these discs contain numerals from 0 to 9, which will be visible when brought into view within the opening 37 during the operation of the device. The four discs proceeding from the left-hand side are arranged to indicate to a total of 9,999 hours of operation and the disc at the extreme right is arranged to indicate in tenths of an hour.

As an added feature, the minute shaft of the clock mechanism is carried through the dial plate and a hand 45 affixed thereto so as to rotate over the forward face of the dial plate and serve as a telltale indicator to show when the meter is operating, and also provide convenient means for regulating and correcting the clock timing mechanism inasmuch as this hand rotates one revolution per minute.

As clearly shown in Figure 8, the pressure switch B comprises a cup-shaped base member 46 which is centrally apertured as shown at 47 to receive a contracted end portion 48 of a connection nipple 49, the contracted end portion 48 being welded or otherwise intimately secured to the base as shown at 50. To complete the casing for the pressure switch, there is provided a second cup-shaped member 51 which is oppositely disposed to the base member and has its open end margin expanded to fit over the periphery of the base member. The open end edge of the cup member 51 is then folded over the bottom of the base member and preferably secured and sealed as by welding as indicated at 52. In expanding the open end margin of the member 51, there is effected a peripherally extending flange portion 53 which limits the sliding movement of the open end portion of the member 51 over the sides of the base member 46.

The members 46 and 51 cooperate to form a sealed casing, and the interior of this casing is separated into two compartments by means of a diaphragm 54 which is secured at its periphery to the side wall of the base member 46 in any suitable manner, but preferably by welding as shown at 55 so as to completely seal the compartments of the casing with respect to each other.

It will be noted that the lowermost compartment is in communication with the bore of the nipple 49 by means of which the compartment below the diaphragm may be connected with a fluid pressure system. The compartment above the diaphragm houses the switch contact mechanism.

The switch contact mechanism comprises a stationary contact 56 which is carried at one end of a threaded screw 57 which is adjustably mounted in an internally threaded bushing 58 which extends through a central opening in the bottom of the cup-shaped member 51. The outermost end of this bushing is provided with an end flange 59 which is arranged to bear against one leg of an angle bracket 60 through which the bushing extends in a suitable opening therein. The innermost end of the bushing is beaded over onto a washer 61, and suitable strips of insulating material as shown at 62 and 63 are interposed on opposite sides of the bottom of member 51 to electrically insulate the washer 61 and the bracket 60 therefrom.

The outermost end of the screw 57 is provided with an end groove 64 which is adapted to receive a suitable tool for rotating the screw 57, whereby the stationary contact 56 may be adjusted within the casing. Once the screw is properly adjusted, its position may be secured by a lock nut 65.

On one side of the stationary contact, there is provided a supporting structure for a movable contact 66 which is disposed immediately below the stationary contact 56. The movable contact is carried at one end of a contact spring 67, the opposite end of this spring being apertured to receive therethrough a bushing 68 of similar construction to the bushing 58. The bushing 68 has at its outermost end an end flange 69 which bears against the outer surface of the insulating strip 62 through which it passes. Surrounding the bushing between the spring strip 67 and the outer face of insulating strip 63 is a spacer block 70 through which the bushing passes. The innermost end of the bushing is beaded over against a retaining washer 71 which bears against the under side of the contact strip 67. This structure securely anchors the associated end of the contact strip, and by providing internal threads in the bushing 68, a terminal screw 72 may be provided for making an electrical connection from the movable contact, through the bushing 68 to a conductor 73, which in the present instance may be electrically connected to the conductor 33 of the totalizing meter.

The bracket 60 is in electrical connection with the stationary contact 56 and may be connected by means of a terminal screw 74 to a conductor 75 which may be connected with an electric supply source such as a battery. The conductors 73 and 75 may be passed through a suitable entrance grommet 76 supported in the wall of a dust cap 77 which is arranged to have its open end slide over the casing member 51 and abut the flange portion 53 thereof.

The dust cap 77 may be retained in position by providing it with wall openings 78 which are adapted to receive therein struck out portions 79 in the wall of the casing member 51, and this cap may be sealed in any well known manner against unauthorized opening.

Carried by the diaphragm 54 is a bracket 80 which supports an upstanding stem member 81 of any suitable insulating material which may be of "Bakelite." The uppermost end of the stem 81 normally bears against the under surface of the contact spring 67 directly below the contact 66.

With the arrangement described, it will be apparent that upon upward flexing of the diaphragm due to an increase of fluid pressure in the lower compartment of the casing, the movable contact 66 will be carried into engagement with the stationary contact 56 to thus complete a circuit through the device. The construction is of further advantage in that the stationary contact and its support form an abutment which prevents abnormal flexing of the diaphragm under excessive pressures to such an extent as to permanently distort the diaphragm or otherwise damage the device.

From the foregoing descriptions, it will be apparent that the present invention provides an improved engine operation recorder having a novel totalizing hour meter which makes use of a standard electric clock mechanism, which may be controlled in its operation either by variations in the oiling system of the engine, the operation of the battery charging system of the engine, or a combination of both; which embodies a totalizing hour meter of simple construction, which is tamper-proof, and efficient and accurate in operation; and which utilizes an improved pressure actuated switch control unit that may be actuated by oil pressure in the engine lubricating system, said unit having a diaphragm and contacts contained within a casing sealed at the factory to prevent leakage and tampering therewith, and which utilizes a novel contact arrangement arranged to prevent abnormal flexing of the diaphragm under excessive pressures to such an extent as to permanently distort the diaphragm or otherwise damage the same.

It is, of course, to be understood that although we have described in detail the present invention and several arrangements for utilizing the same in connection with the indication of the operation of engines, the invention is not to be thus limited but only insofar as defined by the scope and spirit of the appended claims.

We claim as our invention:

1. A totalizing hour meter comprising a casing closed at one end and having a viewing window at its other end, a clock mechanism within said casing resiliently supported from its closed end, a separate casing housing the clock mechanism, a spaced dial plate carried by supports extending from the clock mechanism, said dial plate being viewable through the window and having an opening therein, and a counter register disposed between the dial plate and clock mechanism having a driving connection therewith, said register being viewable through said dial plate opening.

2. A totalizing hour meter comprising a casing closed at one end and having a viewing window at its other end, a clock mechanism within said casing resiliently supported from its closed end, a separate casing housing the clock mechanism, a spaced dial plate carried by supports extending from the clock mechanism, said dial plate being viewable through the window and having an opening therein, and a counter register disposed between the dial plate and clock mechanism having a driving connection therewith, said register being viewable through said dial plate opening, and a telltale clock running indicator movable over the dial plate face, said indicator being actuatable by the clock mechanism.

JOHN W. HOBBS.
JOHN A. MINER.